United States Patent
Khoury

(10) Patent No.: US 8,917,663 B2
(45) Date of Patent: Dec. 23, 2014

(54) METHOD AND APPARATUS FOR TIMING AND/OR FREQUENCY OFFSET MONITORING AND HANDLING

(75) Inventor: Peter George Khoury, San Francisco, CA (US)

(73) Assignee: SpiderCloud Wireless, Inc., San Jose, CA (US)

( * ) Notice: Subject to any disclaimer, the term of this patent is extended or adjusted under 35 U.S.C. 154(b) by 102 days.

(21) Appl. No.: 13/306,836

(22) Filed: Nov. 29, 2011

(65) Prior Publication Data

US 2012/0195256 A1 Aug. 2, 2012

Related U.S. Application Data

(60) Provisional application No. 61/417,850, filed on Nov. 29, 2010.

(51) Int. Cl.
*H04W 4/00* (2009.01)
*H04W 56/00* (2009.01)

(52) U.S. Cl.
CPC ................................ *H04W 56/0035* (2013.01)
USPC ............................. 370/328; 370/350; 370/252

(58) Field of Classification Search
USPC .................. 370/229–235, 252, 329–341, 350
See application file for complete search history.

(56) References Cited

U.S. PATENT DOCUMENTS

| | | | | |
|---|---|---|---|---|
| 6,219,528 | B1* | 4/2001 | Wright et al. | 455/13.4 |
| 7,107,021 | B2* | 9/2006 | Kim et al. | 455/101 |
| 7,126,937 | B2* | 10/2006 | Crosbie et al. | 370/350 |
| 7,558,576 | B2* | 7/2009 | Chen et al. | 455/441 |
| 2009/0154388 | A1* | 6/2009 | Jalloul et al. | 370/312 |

OTHER PUBLICATIONS

Yahata, Haruki. "Autonomous Master-Slave Frame Synchronization among Microcellular Base Stations", Electronics and Communications in Japan, Part 1, vol. 22, No. 4 (Translated from Denshi Joho Tsushin Gakkai Ronbunshi, vol. J81-B-II, No. 4, Apr. 1998, pp. 278-288).

* cited by examiner

*Primary Examiner* — Kan Yuen
(74) *Attorney, Agent, or Firm* — AlbertDhand LLP

(57) ABSTRACT

Methods and apparatuses are provided for obtaining downlink or uplink signal characteristics of at least one access point in a network. The signal characteristics may be obtained through user equipment receiving the signal characteristics, through the at least one access point, or through another access point. Frequency or timing offset between two or more access points may be determined based on the obtained signal characteristics, where the frequency or timing offset may be handled through post processing. For example, a clock servo may be controlled or adjusted in response to the determined offset, the absolute frequency of a master network oscillator may be calibrated, traffic anomalies within the network may be detected and corrected, and/or respective clocks of the two or more access points may be synchronized.

11 Claims, 8 Drawing Sheets

METHOD AND APPARATUS FOR TIMING AND/OR FREQUENCY OFFSET MONITORING AND HANDLING

TECHNICAL FIELD

The present invention relates to communication networks, and more particularly, some embodiments relate to monitoring and handling timing and/or frequency offsets.

BACKGROUND

Many wireless systems require that the clocks of different basestations be synchronized with one another. The clocks of the basestations may need to be synchronized in phase (absolute clock time) and/or frequency (clock rate). The degree to which the clocks of the basestations must be synchronized might be specified in a wireless standards document. Further, the performance of the overall network may be limited by the level of synchronization of the clocks.

One such wireless system is a femtocell network. Femtocells comprise Access Point Base Stations, or Access Points (APs), which are small cellular base stations typically used in buildings, residential environments, or locations with limited lines of sight to nearby antennae. Femtocells enable multiple mobile phones within range to connect to a cellular network through a broadband connection.

SUMMARY

Various aspects of examples of the invention are set out in the claims.

According to a first aspect of the present invention, a method comprises obtaining signal characteristics of two or more access points in a network, the signal characteristics being obtained through one of user equipment or the two or more access points receiving the signal characteristics; detecting an offset between the two or more access points based on the obtained signal characteristics; and performing post processing to handle the offset.

According to a second aspect of the present invention, an apparatus comprises a processor; and a memory including computer program code, the memory and the computer program code configured to, with the at least one processor, cause the apparatus to perform at least the following: obtaining signal characteristics of two or more access points in a network, the signal characteristics being obtained through one of user equipment or the two or more access points receiving the signal characteristics; detecting an offset between the two or more access points based on the obtained signal characteristics; and performing post processing to handle the offset.

According to a third aspect of the present invention, a method comprises: obtaining signal characteristics of a first access point in a network, the signal characteristics being obtained by a second access point in the network configured to collect the signal characteristics from the first access point or listen for a user equipment in simultaneous communication with the first access point and the second access point; determining an offset between the first access point and the second access point based on the obtained signal characteristics; and performing post processing to handle the offset.

According to a fourth aspect of the present invention, an apparatus comprises a processor; and a memory including computer program code, the memory and the computer program code configured to, with the at least one processor, cause the apparatus to perform at least the following: obtaining signal characteristics of a first access point in a network by one of collecting the signal characteristics from the first access point or listening for a user equipment in simultaneous communication with the first access point and the apparatus; determining an offset between the first access point and the apparatus based on the obtained signal characteristics; and performing post processing to handle the offset.

BRIEF DESCRIPTION OF THE DRAWINGS

For a more complete understanding of example embodiments of the present invention, reference is now made to the following descriptions taken in connection with the accompanying drawings in which.

DETAILED DESCRIPTION OF THE DRAWINGS

Example embodiments of the present invention and their potential advantages are understood by referring to FIGS. 1-8 of the drawings.

Figure 1:
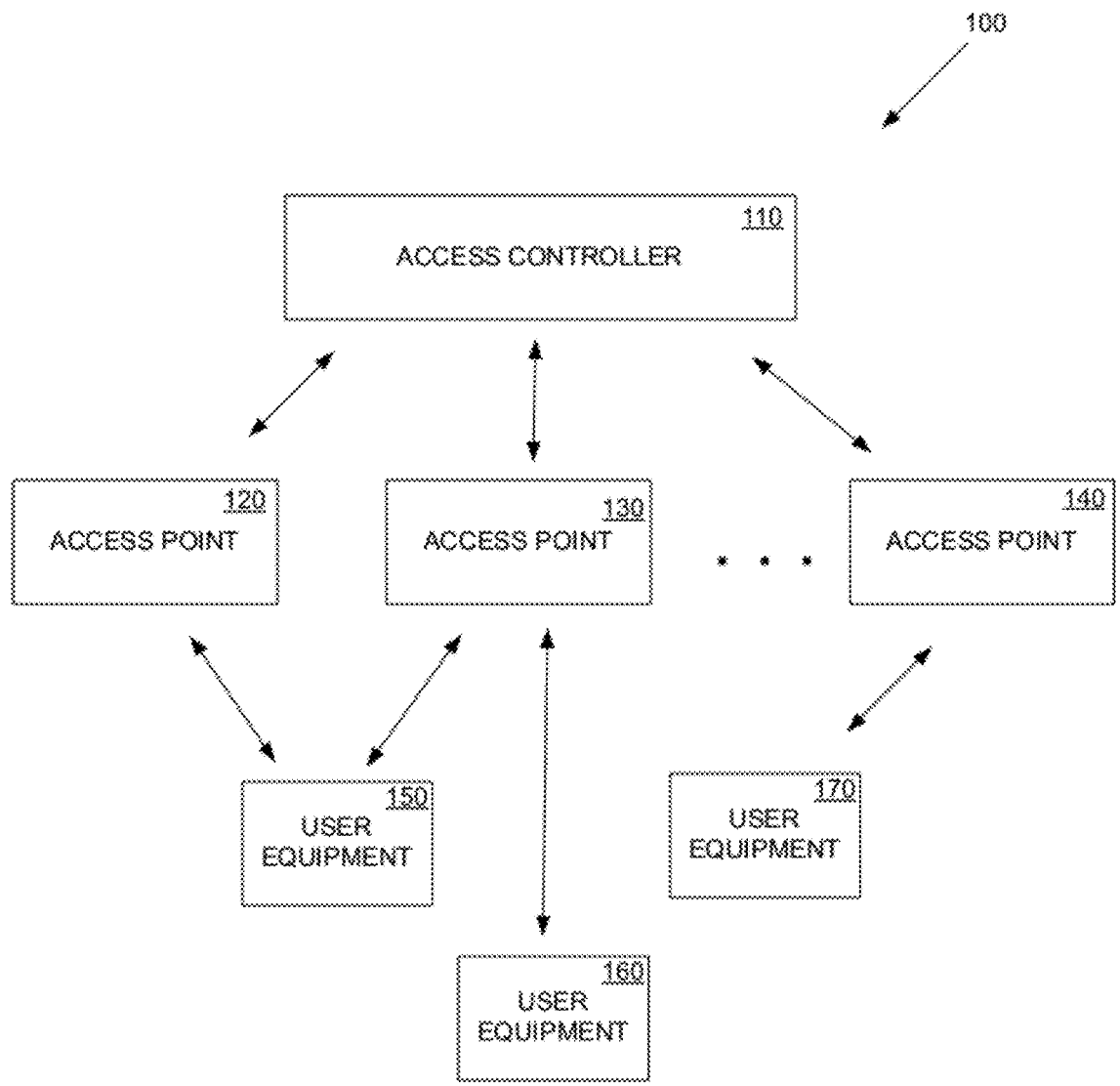
FIG. 1 is a schematic illustration of a network in which embodiments of the present invention may be implemented.

Embodiments of the present invention may be implemented in various types of networks. One example of such a network is a femtocell network. Those skilled in the art will understand that, while various embodimens are described in the context of a femtocell network, other networks are contemplated within the scope of the present invention. Referring now to FIG. 1, a network in which embodiments of the present invention may be implemented is schematically illustrated. The network 100 is an example of a femtocell network. Those skilled in the art will understand that embodiments of the present invention may be implemented in various other types of networks and is not limited to a femtocell network. The network 100 comprises an access controller 110 which may provide access to a public network such as the Internet. In this regard, the access controller 110 may be connected to the Internet through a physical connection (not shown in FIG. 1). The access controller 110 may also control and monitor various aspects of the network as a whole.

The access controller 110 provides access to the Internet to a plurality of access points (or base stations). As illustrated in FIG. 1, the network may include a number of access points, such as access points 120, 130, 140. The access points 120, 130, 140 provide network access to various user devices, such as user equipment 150, 160, 170. The user equipment 150, 160, 170 may include any type of communication devices such as, but not limited to, desktop computer, laptop computers, mobile phones, personal digital assistants (PDA) or the like.

Figure 2:
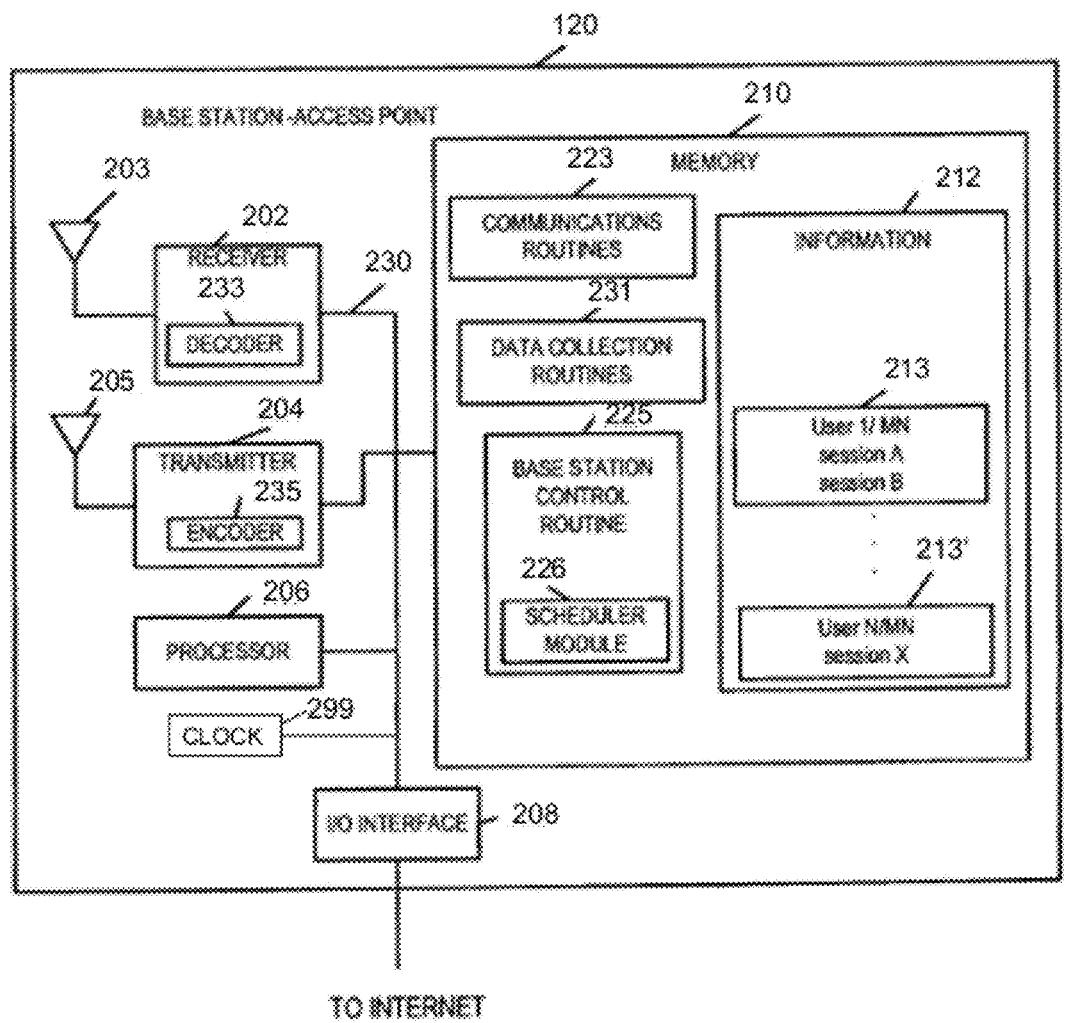
FIG. 2 illustrates an example access point (AP) in accordance with an embodiment of the invention.

Referring now to FIG. 2, an example access point (AP) in accordance with an embodiment of the invention is illustrated. The AP 120 may comprise, for example, an access router, a femtocell controller, or an integrated femtocell and controller. The AP 120 includes antennas 203, 205 and receiver transmitter circuitry 202, 204. The receiver circuitry 202 includes a decoder 233 while the transmitter circuitry 204 includes an encoder 235. The circuitry 202, 204 is coupled by a bus 230 to an I/O interface 208, processor (e.g., CPU) 206 and memory 210. The I/O interface 208 couples the AP 120 to the internet and/or an IP network. The memory 210 includes routines that cause the AP 120 to operate in accordance with embodiments of the invention when executed by the processor 206. The memory 210 also includes communications routines 223 to cause AP 120 to perform various communications operations and implement various communications protocols. The memory 210 also includes a base station/femtocell control routine 225 used to implement the methods described herein. The base station control routine 225 further includes a scheduling module 226 used to control transmission scheduling and/or communication resource allocation. Accordingly, module 226 may serve as a scheduler. Memory 210 also includes information used by communications routines module 223 and control routine module 225. The information 212 includes an entry for each active mobile station user 213, 213' which lists the active sessions being conducted by the user and includes information identifying the mobile station (MN) being used by a user to conduct the sessions. Module 231 represents the data store and information collection that can occur within the access point that can be communicated to other elements or network equipment according to communication routines in module 223. Additionally, the access point 120 includes a clock 299 coupled to the bus 230. Those skilled in the art will understand that such clocks may be controlled by the processor 206.

Figure 3:
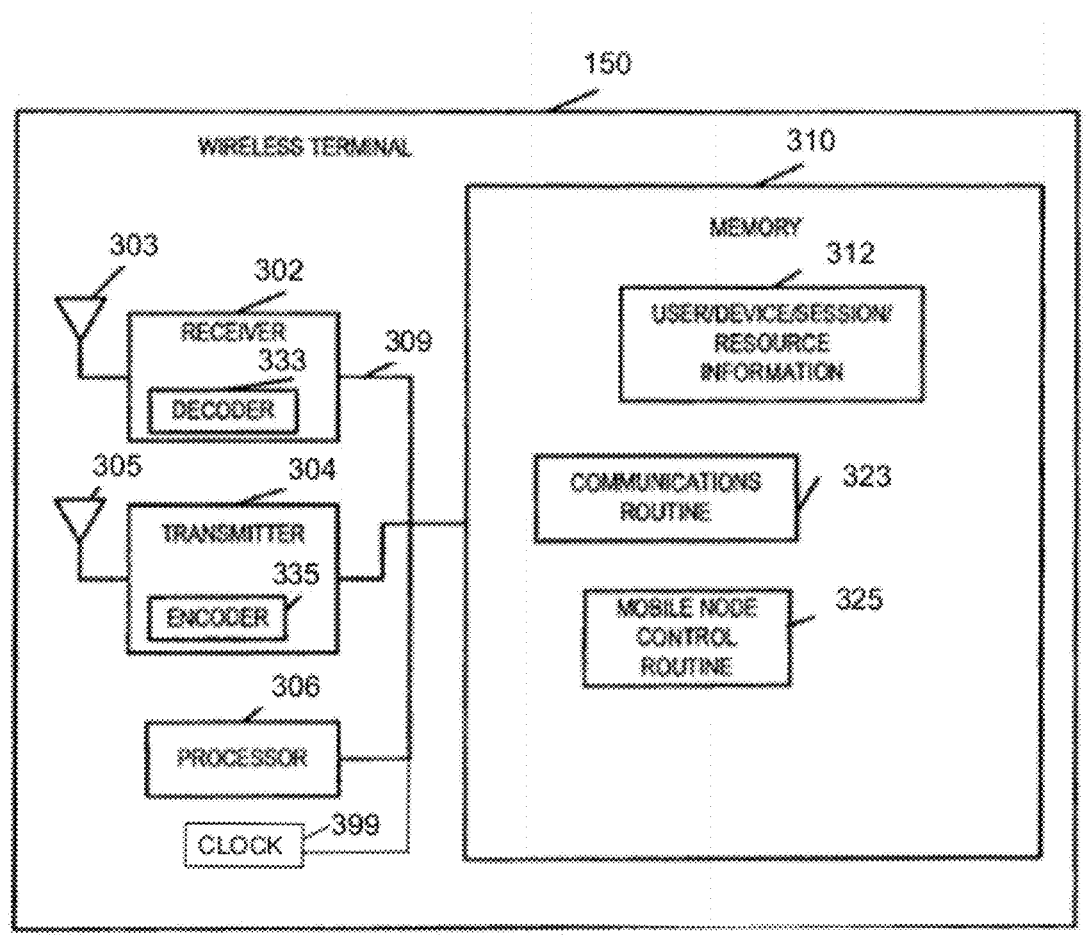
FIG. 3 illustrates an example user equipment (UE) in accordance with an embodiment of the invention.

Referring now to FIG. 3, an example user equipment (UE) 150 in accordance with an embodiment of the invention is illustrated. The UE 150 may comprise a wireless terminal. The UE 150 includes receiver and transmitter antennas 303, 305 coupled to receiver and transmitter circuitry 302, 304 respectively. The receiver circuitry 302 includes a decoder 333 while the transmitter circuitry 304 includes an encoder 335. The receiver transmitter circuits 302, 304 are coupled by a bus 309 to a memory 310. Processor 306, under control of one or more routines stored in memory 310 causes the UE 150 to operate in accordance with embodiments of the present invention as described herein. In order to control mobile node operation, memory 310 includes a communications routine 323, and a mobile node control routine 325. The mobile node routine is responsible for insuring that the mobile node operates in accordance with embodiments of the present invention and performs the steps described herein with regard to mobile node operations. The memory 310 also includes user/device/session/resource information 312 which may be accessed and used to implement the methods of the present invention and/or data structures used to implement the invention. Additionally, the UE 150 includes a clock 399 coupled to the bus 309.

Figure 4:
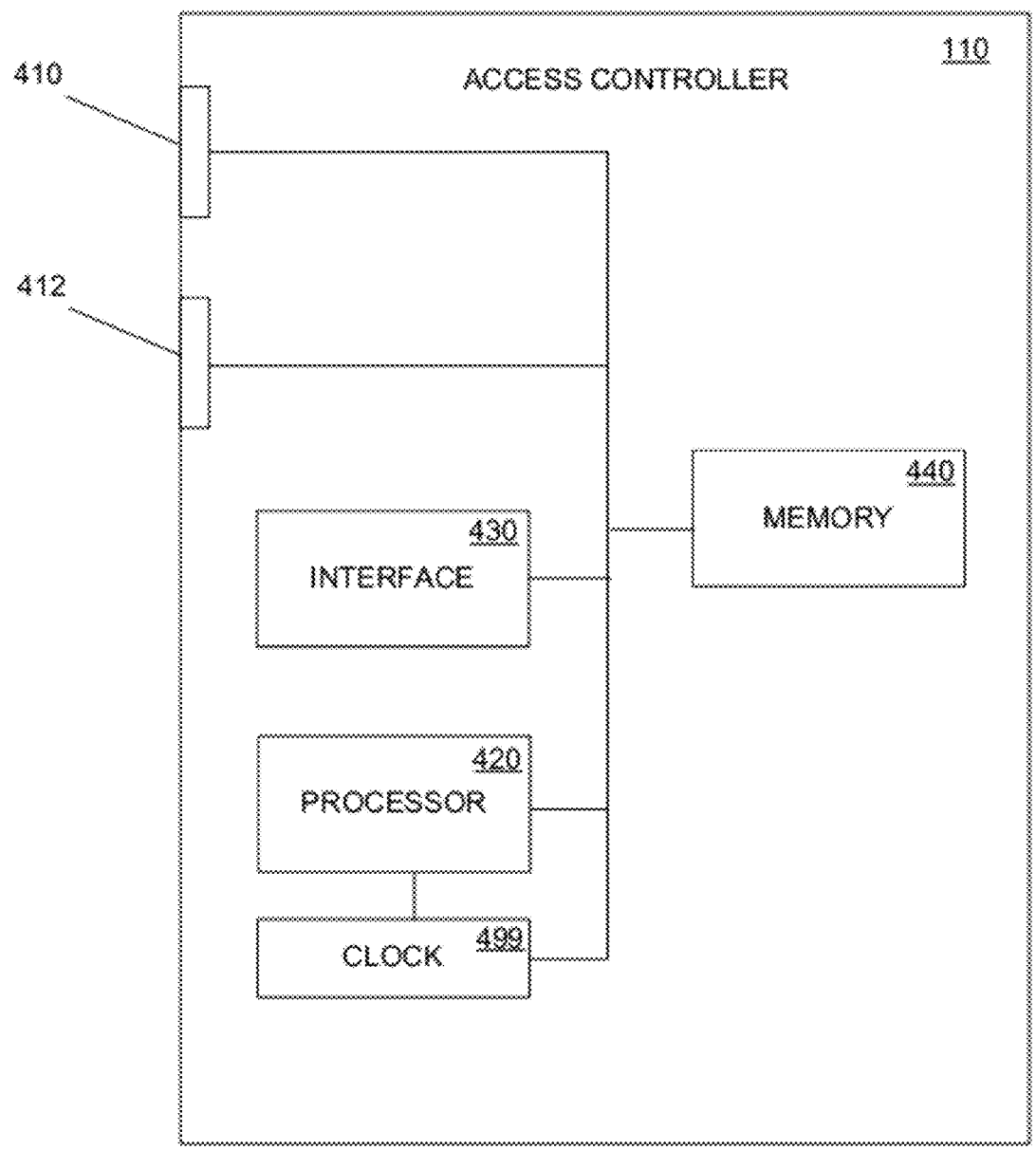
FIG. 4 illustrates an example network entity in accordance with an embodiment of the invention.

Referring now to FIG. 4, an example access controller in accordance with an embodiment of the invention is illustrated. The access controller 110 comprises interface ports. A first port 410 provides a physical connection between the access controller 110 and a public network, e.g., the Internet. A second port 412 provides for communication between the access controller 110 and one or more access points. In one embodiment, the communication between the access controller 110 and the access points, via the second port 412, uses an enterprise backhaul to provide a wired connection to the access points. The access controller 110 further comprises a processor 420 configured to execute instructions. An interface 430 is provided to allow a user to input and output information. The interface 430 may provide a graphical user interface to the user for controlling or accessing the access controller 110. A memory 440 is provided to store information, such as computer code or data. The memory 440 may be any of various types of non-transitory computer-readable media. The memory 440 may be used to aggregate and/or store information received by the access controller 110 from, for example, the various access points. Additionally, the access controller 110 includes a clock 499 coupled to a bus. Those skilled in the art will understand that such clocks may be controlled by the processor 420.

As noted above, in networks such as that described above with reference to FIGS. 1-4, the clocks of the access points may need to be synchronized in phase (absolute clock time) and/or frequency (clock rate). The degree to which the clocks of the access points must be synchronized might be specified in a wireless standards document. Further, the performance of the overall network may be limited by the level of synchronization of the clocks. Current available systems require expensive components, such as clocks having great accuracy. Embodiments of the present invention provide improved methods and systems for monitoring and handling timing offsets and frequency offsets for the access points in a network. Various embodiments are described below.

Figure 5:
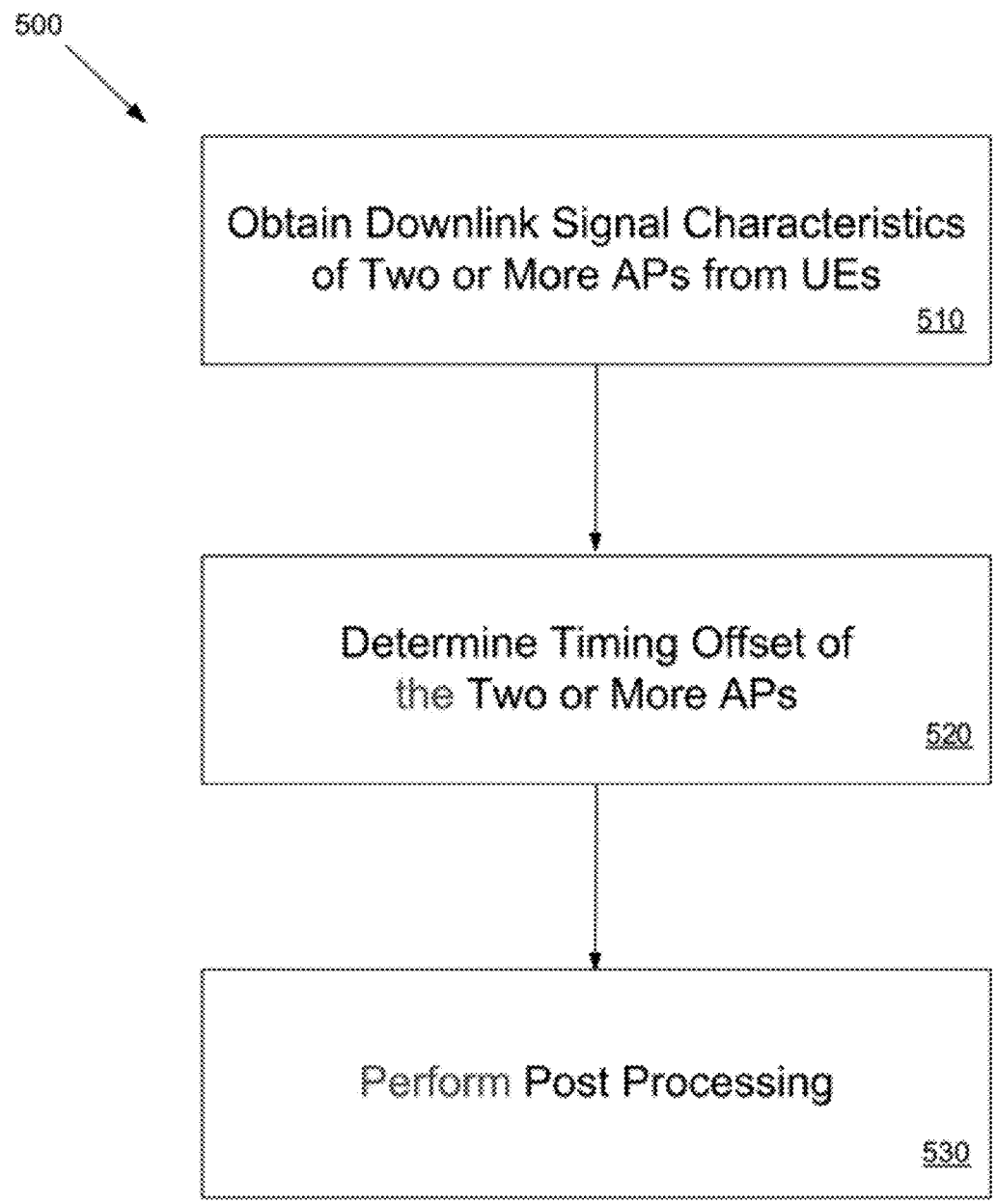
FIG. 5 is a flow chart illustrating a process for monitoring and handling offset in accordance with an embodiment of the invention.

Referring now to FIG. 5, a flow chart illustrates a process in accordance with an embodiment of the invention. In accordance with the illustrated embodiment, the process 500 includes obtaining characteristics of downlink signals from the various access points (block 510). In various embodiments, the information may be obtained by the access controller through a request for the information at a predetermined frequency. In this regard, the signal characteristics of the downlink signals corresponding to the access points are obtained from the user equipment. As used herein, signal characteristics may include, but are not limited to, clock timing information, clock frequency information, signal strength, and/or signal power. In various embodiments, the signal characterisitcs are obtained from the user equipment through a preexisting, standards-based message transmitted from the UE to the access point which reports downlink signal characteristics. In this regard, in addition to sending the messages to the access points, the UE may also send the message to the access controller or another network entity. In other embodiments, the message sent from the UE to the access point may be forwarded to the access controller by the access point. In one embodiment, the message reports timing information, frequency information, signal strength, and/or signal power. In other embodiments, the desired information is inferred or derived from secondary reported parameters, such as requested modulation class. One example of such a message is the measurement report message defined in the 3GPP protocol TS 25.331 section 10.2.19. This 3GPP protocol message returns to the access controller (or another network entity) the scrambling codes of access points which are close to the UE, the signal powers of the access points and their timing relative to the UE and, therefore, to each other.

Based on the signal characteristics of the downlink signals from the access points received from the UE's, the access controller may determine a timing offset of the two or more access points (block 520). At block 530, the access controller performs post processing to handle the timing offset. Details on post processing in accordance with embodiments of the invention are described below.

In various embodiments, different aspects of the process may be performed by different entities. For example, in one embodiment, the access controller may aggregate the signal characteristic information and return the aggregated information to an access point. The access point may act on that information by, for example, adjusting or controlling its clock servo accordingly. In other embodiments, the access point may itself aggregate the information and act accordingly.

Figure 6:
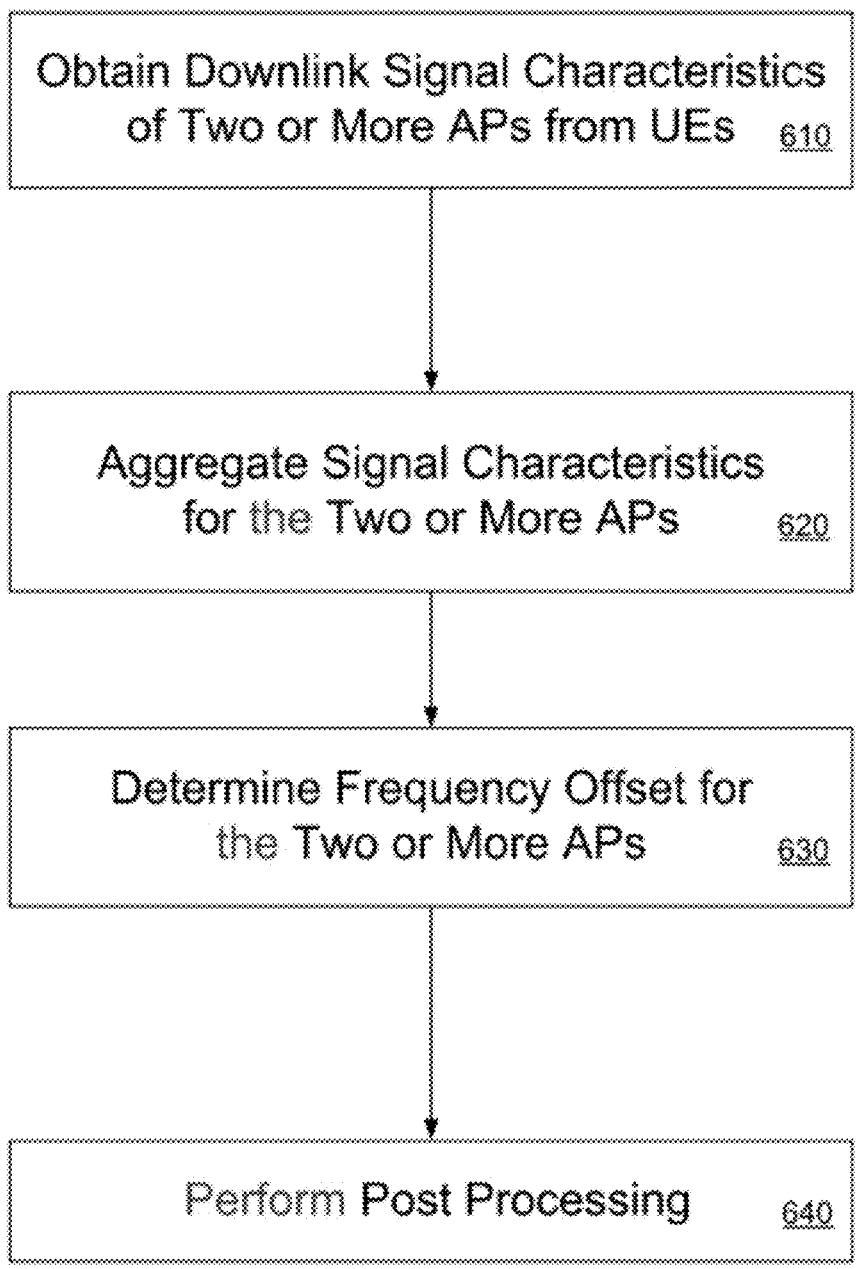
FIG. 6 is a flow chart illustrating a process for monitoring and handling offset in accordance with another embodiment of the invention.

Referring now to FIG. 6, a flow chart illustrates a process in accordance with another embodiment of the invention. In the embodiment of FIG. 6, characteristics of downlink signals from the various access points are obtained from UEs (block 610), as described above with reference to block 510 of FIG. 5. However, in the embodiment of FIG. 6, the signal characteristics for the various access points are aggregated (block 620). Monitoring the change in the timing offsets over time allows the access controller to determine or measure a frequency offset for the access points (block 630). In this regard, if one access point has a frequency offset relative to another, then the difference between the timing measurements as observed by all UE's listening to both access points will either shrink or grow. The determined frequency offset may be post processed as described in detail below (block 640).

Figure 7:
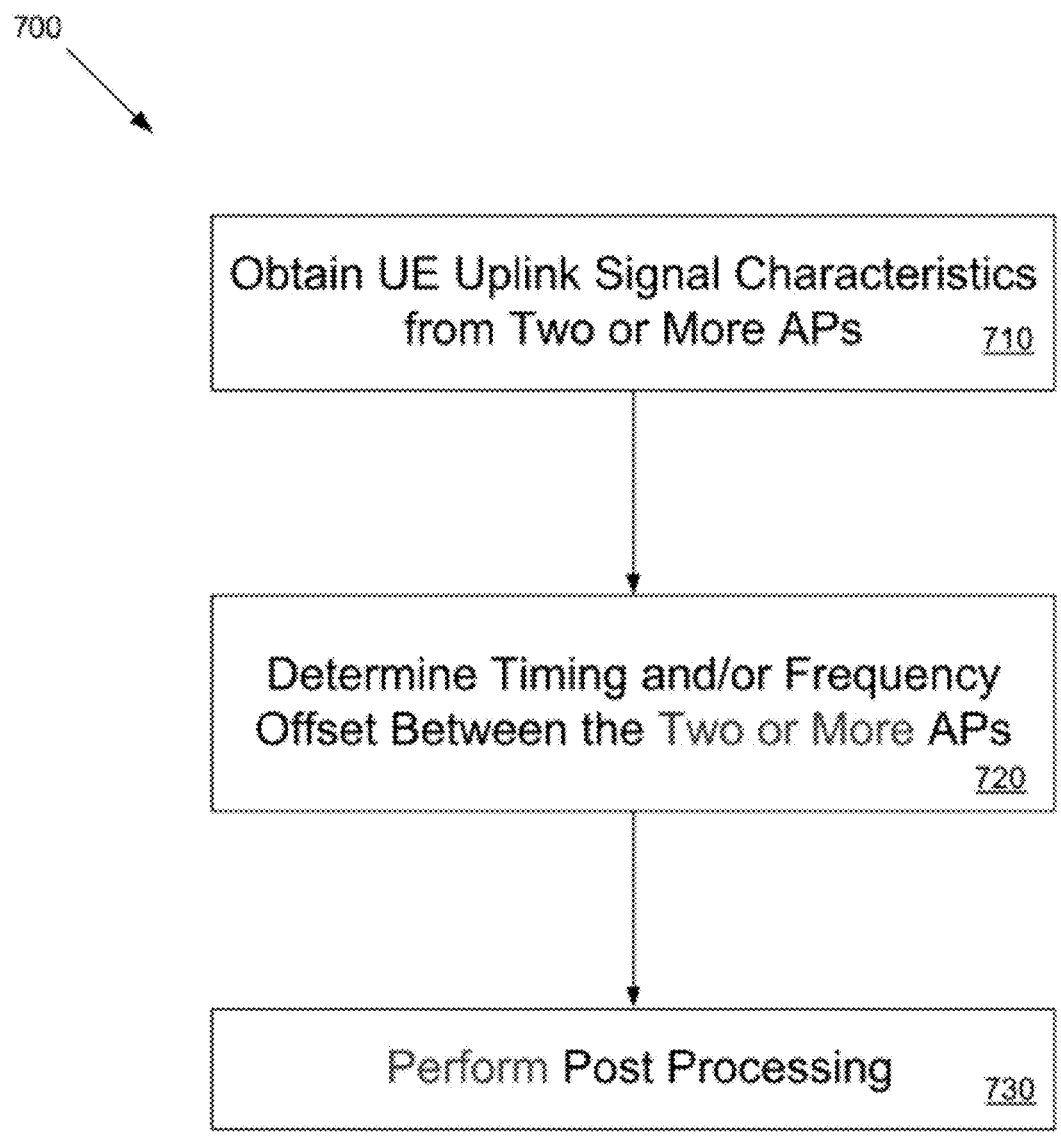
FIG. 7 is a flow chart illustrating a process for monitoring and handling offset in accordance with yet another embodiment of the invention.

Referring now to FIG. 7, a flow chart illustrates a process in accordance with still another embodiment of the invention. In the embodiment of FIG. 7, uplink signals from the various user equipment to the access points are used to measure timing and frequency offsets. In this regard, uplink frequency offset information present on any access points which receives a particular UE's signal is used. In particular, this embodiment is effective when two or more access points receive signals from the same UE.

For example, the Universal Mobile Telecommunications System (UMTS) protocol allows for a mode of operation called soft-handover. During the soft-handover, the UE is in communication with more than one access point. The access controller may obtain the signal characteristics from the two or more APs (block 710).

As noted above, in one embodiment, a soft-handover is used as an opportunity due to multiple APs receiving signals from the same UE. In other embodiments, a second access point could be instructed to listen for the UE solely for the purposes of monitoring signal characterisitics.

Any difference in frequency offsets or the timing offsets in the signals is due to frequency offset between the two access points. In accordance with certain embodiments of the invention, a report is created and sent to the access controller or another network entity for aggregating purposes. It is noted that, in this embodiment, aggregation of the signal characteristic information is not necessary. Based on the information obtained, a frequency offset and/or a timing offset may be determined between the two or more APs (block 720) and may be post processed (block 730).

Figure 8:
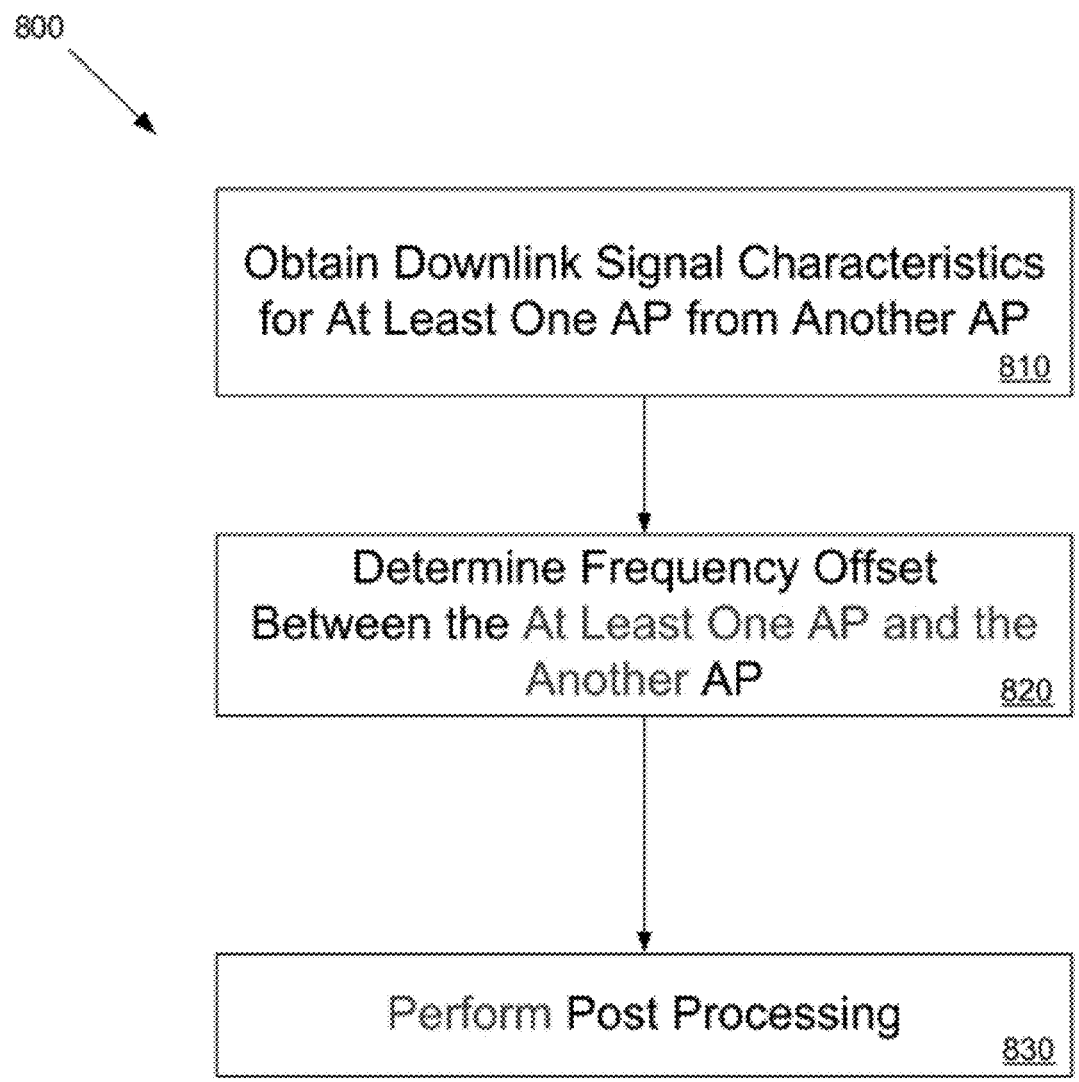
FIG. 8 is a flow chart illustrating a process for monitoring and handling offset in accordance with still another embodiment of the invention.

Referring now to FIG. 8, a flow chart illustrates a process in accordance with still another embodiment of the invention. The embodiment of FIG. 8 is similar to that of FIG. 6 in that characteristics of downlink signals from the various access points are obtained. However, while the embodiment of FIG. 6 obtains these characteristics through the UEs, the embodiment of FIG. 8 obtains the characteristics of one AP from another AP (block 810). Thus, a second AP may collect the signal characteristics of a nearby AP. In this regard, an access point which has the ability to measure the downlink signals of other surrounding basestations is placed in a listening mode. The information obtained by the second AP may be used to determine frequency offsets between the one AP and the another AP (block 820), and may be post processed (block 830). In this regard, the determination may be made by either the access controller using information of both APs or by the second AP without passing the information to the access controller. This embodiment has the advantage that the basestation is fixed in space and doesn't move. If this location is known, it could be used to correct the timing information gathered. A further advantage of this embodiment is that frequency error can be directly measured from the wireless signal, rather than having to be deduced from timing measurements. Measurement reports may be created if the information needs to be aggregated in a central location, such as the access controller or another network entity. In further embodiments, the access point may listen to wireless protocols other than its own in order to gain timing information. For example, a UMTS access point in listening mode may listen to GSM or LTE basestation signals, which must be not only frequency locked but also timing locked. Further, the access point may listen to access points outside its own network.

The signal characteristics obtained in accordance with the various embodiments may be used for various purposes. In one embodiment, the signal characteristic information may be used to allow faster and more accurate absolute frequency calibration of a master oscillator. In this regard, rather than having an expensive oscillator to be the master oscillator for the entire network, a less expensive component may be used that has good stability properties but is less accurate. In this regard, since the access points through which the signal characteristic information is obtained have excellent absolute frequency accuracy, this information could be used to calibrate the less expensive oscillator to be accurate.

In another embodiment, the signal characteristic information is used to detect and correct for anomalies in the IEEE 1588 Precision Time Protocol (PTP) network traffic. For example, IEEE 1588 assumes packet delay symmetry, i.e. that the average length of time for a packet to travel between master and slave is the same as the average travel time from slave to master. If this assumption is violated, there is skew between the two clocks with the clocks being frequency locked but having a timing offset. By detecting basestation timing wirelessly, any persistent network asymmetries can be detected. Further, if wired network conditions change dramatically, wireless PTP information (e.g., the signal characteristic information) may allow the system to holdover and to stay accurate for longer periods of time, thus making the system more robust. Wireless PTP information may allow detection of slow changes in network behavior that may be difficult or impossible to detect otherwise.

In another embodiment, the obtained signal characteristic information may be used to synchronize the clocks of the various access points so that the timing of the over-the-air signals is synchronized, rather than synchronized in an absolute sense. Timing synchronization protocol that travels over a wired network, such as IEEE 1588 PTP protocol, does not experience the same impairment as wireless signals. For example, wireless signals experience delay as they propagate over the air and, even if the clocks of two access points are perfectly and absolutely synchronized, if one basestation is further from a cluster of UEs, the over-the-air signals transmitted by the two basestations will not be synchronized. To correct for this, the timing of the clock of a distant access point could be advanced so that its over-the-air wireless signal could be received by a UE at the same time as the nearby basestations. Embodiments of the present invention allow knowledge of not just clock synchronization at the various basestations, but also over-the-air, which is where the synchronization may be more important. Thus, embodiments of the present invention provide a simple way of achieving over the air synchronization.

As noted above, embodiments of the present invention obtain signal characteristic information and determine timing and/or frequency offsets. Based on this determination, the information is post processed. In accordance with embodiments of the present invention, a number of reports of such signal characteristic information are aggregated to produce more accurate estimates to be fed into a PTP controller, which may be part of the access controller or another network entity. Different embodiments may aggregate this information differently. In one embodiment, a number of measurements are averaged. In another embodiment, the measurements are averaged, but the measurements are weighted based on signal quality, with greater weight going to those measurements derived from signals with greater power or greater signal-to-noise ratio. In another embodiment, the signals are averaged based on the source of the measurement. For example, to get an accurate estimate of frequency, each of a number of macro basestations are averaged, putting equal weight on each macro basestation, first averaging all measurements of a particular macro basestation, and then averaging all the different macro offsets.

In one embodiment, the network IEEE 1588 PTP information may be used within an inner loop providing the tight small time scale correction, while the wireless PTP information obtained as described above may be used in an outer loop to control targets and parameters of the inner loop. In another embodiment, the wireless PTP information may be given equal status and incorporated directly into the PTP controller (e.g., the access controller or another network entity). In another embodiment, enough UEs are in the network (e.g., femtocell network) to get sufficient statistical information about frequency offset and timing offset to operate a PTP system without the need for IEEE 1588 messages.

Various embodiments may have different information flow. In one embodiment, the access controller aggregates all information and re-distributes it to the basestations, including all PTP information (both networked and wireless). Thus, the access controller has a master clock and performs the statistical averaging of wireless PTP information. In another embodiment, the point of aggregation might change as the system comes up. For example, when the femtocell network is brought up, the access point with the clearest macro basestation signal may become the master clock and distribute network timing information to all the other access points. Only after that access point goes out of network monitoring and enters normal operation does the master clock shift to the access controller.

While various embodiments of the present invention have been described above, it should be understood that they have been presented by way of example only, and not of limitation. Likewise, the various diagrams may depict an example architectural or other configuration for the invention, which is done to aid in understanding the features and functionality that can be included in the invention. The invention is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the present invention. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the invention is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus, the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:
1. A method, comprising:
obtaining signal characteristics of two or more access points in a network, the signal characteristics being obtained through one of user equipment or the two or more access points receiving the signal characteristics;

detecting an offset between the two or more access points based on the obtained signal characteristics, the offset being at least one of a timing offset or a frequency offset; and performing post processing to handle the offset; and aggregating the signal characteristics over a period of time, the signal characteristics comprising downlink signal characteristics, and wherein the detecting of the offset is based upon the aggregated downlink signal characteristics, and further wherein the detecting of the offset comprises determining a frequency offset between the two or more access points based upon monitored changes in a timing offset between the two or more access points over the period of time.

2. The method of claim 1, wherein the obtaining of the signal characteristics comprises requesting downlink signal characteristics.

3. The method of claim 2, wherein the downlink signal characteristics are requested at a predetermined frequency from the user equipment.

4. The method of claim 1, wherein the obtaining of the signal characteristics comprises obtaining downlink signal characteristics through a preexisting standards-based message.

5. The method of claim 4, wherein the downlink signal characteristics are one of inferred or derived from secondary parameters reported in the preexisting standards-based message.

6. The method of claim 1, wherein the signal characteristics include at least one of clock timing information, clock frequency information, signal strength and signal power.

7. The method of claim 1, wherein the signal characteristics comprise uplink signal characteristics received by the two or more access points from the user equipment, and further wherein the offset is one of a timing offset or a frequency offset.

8. The method of claim 1, wherein the post processing comprises at least one of controlling a clock servo of at least one of the two or more access points, calibrating an absolute frequency of an oscillator of the network, detecting and correcting traffic anomalies within the network, and synchronizing respective clocks of the two or more access points.

9. A non-transitory computer-readable medium including computer code, the computer code, which when executed by a processor, cause an apparatus to perform a method as claimed in claim 1.

10. An apparatus, comprising:

a processor; and a memory including computer program code, the memory and the computer program code configured to, with the processor, cause the apparatus to perform at least the following:

obtaining signal characteristics of two or more access points in a network, the signal characteristics being obtained through one of user equipment or the two or more access points receiving the signal characteristics;

detecting an offset between the two or more access points based on the obtained signal characteristics, the offset being at least one of a timing offset or a frequency offset; and performing post processing to handle the offset;

aggregating the signal characteristics over a period of time, the signal characteristics comprising downlink signal characteristics; and basing the detection of the offset is upon the aggregated downlink signal characteristics, wherein, to perform the detecting of the offset, the memory and the computer program code are further configured to, with the processor, cause the apparatus to determine a frequency offset between the two or more access points based upon monitored changes in a timing offset between the two or more access points over the period of time.

11. The apparatus of claim 10, wherein the signal characteristics comprise one of uplink signal characteristics received by the two or more access points from the user equipment or downlink signal characteristics obtained through the user equipment, and further wherein the offset is one of a timing offset or a frequency offset.

* * * * *